（12) United States Patent
Ranganathan (10) Patent No.: US 10,211,935 B2
(45) Date of Patent: *Feb. 19, 2019

(54) VERIFICATION OF RADIO STATION WATERMARKING WITH SOFTWARE DEFINED RADIOS

(71) Applicant: The Nielsen Company (US), LLC, New York, NY (US)

(72) Inventor: Raghuram Ranganathan, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/885,358

(22) Filed: Jan. 31, 2018

(65) Prior Publication Data

US 2018/0175951 A1 Jun. 21, 2018

Related U.S. Application Data

(63) Continuation of application No. 15/380,749, filed on Dec. 15, 2016, now Pat. No. 9,887,787.

(51) Int. Cl.
  *H04B 1/16* (2006.01)
  *H04H 20/12* (2008.01)
  (Continued)

(52) U.S. Cl.
  CPC ............. *H04H 20/12* (2013.01); *H04B 17/13* (2015.01); *H04B 17/318* (2015.01); *H04L 43/14* (2013.01); *H04H 2201/50* (2013.01)

(58) Field of Classification Search
  CPC ....... H04H 20/12; H04B 17/318; H04L 43/14
  (Continued)

(56) References Cited

U.S. PATENT DOCUMENTS 4,931,871 A 6/1990 Kramer
5,355,161 A 10/1994 Bird et al.
(Continued)

OTHER PUBLICATIONS

Chen et al., "Spectrum monitoring for wireless TV and FM broadcast using software-defined radio," Multimedia Tools and Applications, Springer, published online Jul. 1, 2015. (excerpt—2 pages).
(Continued)

*Primary Examiner* — Sanh D Phu
(74) *Attorney, Agent, or Firm* — Hanley, Flight & Zimmerman, LLC (57) ABSTRACT

Methods, apparatus, systems and articles of manufacture to verify radio station watermarking with software defined radios are disclosed. Example apparatus disclosed herein include a notch filter having a bandwidth and a center frequency corresponding to a first radio station broadcast signal, and a software defined radio front-end to downconvert a radio frequency band to a baseband signal, the radio frequency band including a second radio station broadcast signal different from the first radio station broadcast signal. Disclosed example apparatus also include a software defined radio application to tune to a portion of the baseband signal corresponding to the second radio station broadcast signal and to demodulate the portion of the baseband signal to generate audio data corresponding to the second radio station broadcast signal. Disclosed example apparatus further include a watermark decoder to detect a watermark in the audio data corresponding to the second radio station broadcast signal.

20 Claims, 7 Drawing Sheets

(51) Int. Cl.
  *H04L 12/26* (2006.01)
  *H04B 17/318* (2015.01)
  *H04B 17/13* (2015.01)
(58) Field of Classification Search
  USPC .......................................................... 455/214
  See application file for complete search history.

(56) References Cited

U.S. PATENT DOCUMENTS

| | | | |
|---|---|---|---|
| 5,437,050 | A | 7/1995 | Lamb et al. |
| 5,457,807 | A | 10/1995 | Weinblatt |
| 5,519,890 | A | 5/1996 | Pinckley |
| 5,584,051 | A | 12/1996 | Göken |
| 6,807,405 | B1 | 10/2004 | Jagger et al. |
| 7,116,958 | B1 | 10/2006 | Brown et al. |
| 7,945,229 | B2 | 5/2011 | Wilson et al. |
| 8,565,811 | B2 | 10/2013 | Tan et al. |
| 8,768,714 | B1 | 7/2014 | Blesser |
| 9,178,537 | B2 | 11/2015 | Pärssinen et al. |
| 9,407,482 | B2 | 8/2016 | Aggarwal et al. |
| 9,887,787 | B1 * | 2/2018 | Ranganathan ......... H04H 20/12 |
| 2008/0225168 | A1 | 9/2008 | Ouslis et al. |
| 2013/0259102 | A1 | 10/2013 | Gudem et al. |
| 2013/0336427 | A1 | 12/2013 | Volnhals |
| 2015/0221316 | A1 | 8/2015 | Mufti |

OTHER PUBLICATIONS

Naveed et al., "DSP based Software Defined Radio for FM Demodulation," Institute of Industrial Electronics Engineering, IIEE, PCSIR, 2013, 104 pages.

United States Patent and Trademark Office, "Non-final Office Action," mailed in connection with U.S. Appl. No. 15/380,749, dated May 24, 2017, 10 pages.

United States Patent and Trademark Office, "Notice of Allowance," mailed in connection with U.S Appl. No. 15/380,749, dated Aug. 26, 2017, 2017, 5 pages.

* cited by examiner

VERIFICATION OF RADIO STATION WATERMARKING WITH SOFTWARE DEFINED RADIOS

RELATED APPLICATION(S)

This patent arises from a continuation of U.S. patent application Ser. No. 15/380,749 (now U.S. Pat. No. 9,887, 787), which is entitled "VERIFICATION OF RADIO STATION WATERMARKING WITH SOFTWARE DEFINED RADIOS," and which was filed on Dec. 15, 2016. Priority to U.S. patent application Ser. No. 15/380,749 is hereby expressly claimed. U.S. patent application Ser. No. 15/380, 749 is hereby incorporated by reference in its entirety.

FIELD OF THE DISCLOSURE

This disclosure relates generally to radio station watermarking and, more particularly, to verification of radio station watermarking with software defined radios.

BACKGROUND

Media watermarking (e.g., such as audio watermarking, video watermarking, etc.) can be used to identify media, such as television broadcasts, radio broadcasts, advertisements (television and/or radio), downloaded media, streaming media, prepackaged media, etc. For example, media watermarks, such as audio watermarks, are used extensively by audience measurement entities to monitor radio station broadcast signals and identify the station and/or program to which a radio receiver is tuned. Radio station watermarking techniques identify radio station broadcasts by embedding one or more codes (e.g., one or more watermarks) conveying identifying information, and/or an identifier that may be mapped to identifying information, into an audio component of the radio station broadcast. To identify a watermarked broadcast, the watermark(s) are extracted and, for example, decoded and/or used to access a table of reference watermarks that are mapped to identifying information, such as a radio station identifier, a radio program identifier, etc.

BRIEF DESCRIPTION OF THE DRAWINGS

Wherever possible, the same reference numbers will be used throughout the drawing(s) and accompanying written description to refer to the same or like parts, elements, etc.

DETAILED DESCRIPTION

Methods, apparatus, systems and articles of manufacture (e.g., physical storage media) to verify radio station watermarking with software defined radios are disclosed herein. Example methods disclosed herein to verify watermarking of radio station broadcasts include calibrating a notch filter to attenuate a first radio station broadcast signal. Disclosed example methods also include tuning a software defined radio to demodulate a second radio station broadcast signal from an output of the notch filter, the second radio station broadcast signal different from the first radio station broadcast signal. Disclosed example methods further include processing, with a watermark decoder, audio data resulting from the tuning of the software defined radio to verify watermarking of the second radio station broadcast signal.

For example, the software defined radio can include a software defined radio front-end and a software defined radio application (e.g., executed by a processor). In some such disclosed examples, the tuning of the software defined radio includes controlling the software defined radio front-end to downconvert a radio frequency band (e.g., which includes the first radio station broadcast signal and the second radio station broadcast signal) to a baseband signal, and controlling the software defined radio application to (1) tune to a portion of the baseband signal corresponding to the second radio station broadcast signal and (2) demodulate the portion of the baseband signal to generate the audio data. Furthermore, in some such disclosed examples, the controlling of the software defined radio front-end includes configuring a receiver center frequency corresponding to a center frequency substantially at the midpoint of the radio frequency band. Additionally or alternatively, in some such disclosed examples, the controlling of the software defined radio application includes configuring the software defined radio application to implement a frequency modulation (FM) demodulator (e.g., when the radio frequency band corresponds to the FM radio band) and/or an amplitude modulation (AM) demodulator (e.g., when the radio frequency band corresponds to the AM radio band) to demodulate the baseband signal to generate the audio data, and storing the audio data in an audio data file associated with the second radio station broadcast signal.

Additionally or alternatively, in some such disclosed example methods, the calibrating of the notch filter includes controlling a first software defined radio front-end to transmit a sinusoidal signal to an input of the notch filter, the sinusoidal signal having a frequency corresponding to a carrier frequency of the first radio station broadcast signal. Some such disclosed example methods also include controlling a second software defined radio front-end to receive a radio frequency signal from an output of the notch filter based on a receiver center frequency corresponding to the carrier frequency of the first radio station broadcast signal. Some such disclosed example methods further include adjusting the notch filter to attenuate a strength of the radio frequency signal received by the second software defined radio front-end by at least a threshold amount relative to a strength of the sinusoidal signal transmitted by the first software defined radio front-end.
}

Additionally or alternatively, in some disclosed examples, the notch filter is a first notch filter and the first notch filter filters an output of a second notch filter. Some such disclosed example methods further include calibrating the second notch filter to attenuate a third radio station broadcast signal different from the first radio station broadcast signal and the second radio station broadcast signal.

These and other example methods, apparatus, systems and articles of manufacture (e.g., physical storage media) to verify radio station watermarking with software defined radios are disclosed in further detail below.

As noted above, audience measurement entities (AMEs) employ audio watermarks to monitor radio station broadcast signals and identify the station and/or program to which a radio receiver is tuned. Radio station watermarking techniques identify radio station broadcasts by embedding one or more codes (e.g., one or more watermarks) conveying identifying information and/or an identifier that may be mapped to identifying information, into an audio component of the radio station broadcast. The identifying information can include, for example, a radio station identifier, a radio program identifier, etc.

Accordingly, the accuracy and reliability of radio station monitoring based on audio watermarking depends on proper configuration of the watermarking equipment at the radio station broadcast sites. Thus, AMEs use radio station monitors to detect and evaluate the watermarks embedded in radio station broadcasts. Such a radio station monitor can be used to verify proper operation of the watermarking equipment at the various radio stations in a given geographical area. However, prior radio station monitors typically require dedicated reception equipment for each radio station to be monitored and, thus, are expensive to install, operate and maintain. Furthermore, such expense may cause AMEs to limit the use of radio station monitors to larger markets, thereby foregoing verification of radio station watermarking in smaller markets.

Unlike such prior radio station monitors, example radio station monitors disclosed herein do not rely on dedicated reception equipment for each radio station to be monitored. Instead, example radio station monitors disclosed herein are implemented by a software defined radio (SDR). The SDR includes an SDR software application executed by a processor to control an SDR front-end to downconvert an entire FM or AM radio band to a baseband signal. The SDR application then (1) tunes to a portion of the baseband signal corresponding to a given radio station broadcast signal of interest and (2) demodulates the portion of the baseband signal using an appropriately configured FM or AM demodulator to receive audio data corresponding to the radio station broadcast. The received audio data is then processed by a watermark decoder to detect and verify the watermarks that were embedded in the audio data of the given radio station broadcast signal. Thus, such a single SDR-based radio station monitor can be used to monitor the broadcast signals for multiple radio stations, rather than utilizing separate, dedicated reception equipment for each radio station of interest.

Disclosed example SDR-based radio station monitors further include one or more notch filter(s) to improve the ability of the SDR to receive weaker radio station broadcasts in a given geographical area. For example, the notch filter(s) is(are) used to remove (e.g., attenuate) one or dominant radio station signals being broadcast in the band. The dominant radio station signals act as noise to the weaker radio station in the geographical area. Removing (attenuating) the dominant radio station signal(s) lowers the noise floor associated with the weaker radio station signal(s), thereby allowing such weaker radio stations to be received with the SDR. In some examples, the dominant radio station(s) are processed separately by one or more other radio station monitors, such as a prior radio station monitor or another example SDR-based radio station monitor as disclosed herein. Such disclosed example radio station monitoring solutions can achieve substantial costs savings over prior radio station monitoring techniques by reducing the amount of dedicated reception hardware to just one SDR front-end for monitoring all radio stations of interest, or one-SDR front-ends for monitoring multiple, weaker radio stations of interest in combination with just a few additional monitors for monitoring a few dominant radio stations in the given geographical area.

Furthermore, because the dominant radio station(s) may vary from broadcast area to broadcast area, the notch filter(s) of the example SDR-based radio station monitors disclosed herein are typically adjustable (e.g., tunable). Prior techniques for calibrating notch filters often involve use of specialized, expensive test equipment, such as signal generators, spectrum analyzers, etc. However, example notch filter calibration systems disclosed herein utilize multiple (e.g., two), relatively lower cost SDR front-ends to enable notch filter calibration without the use of such specialized, expensive test equipment.

Figure 1:
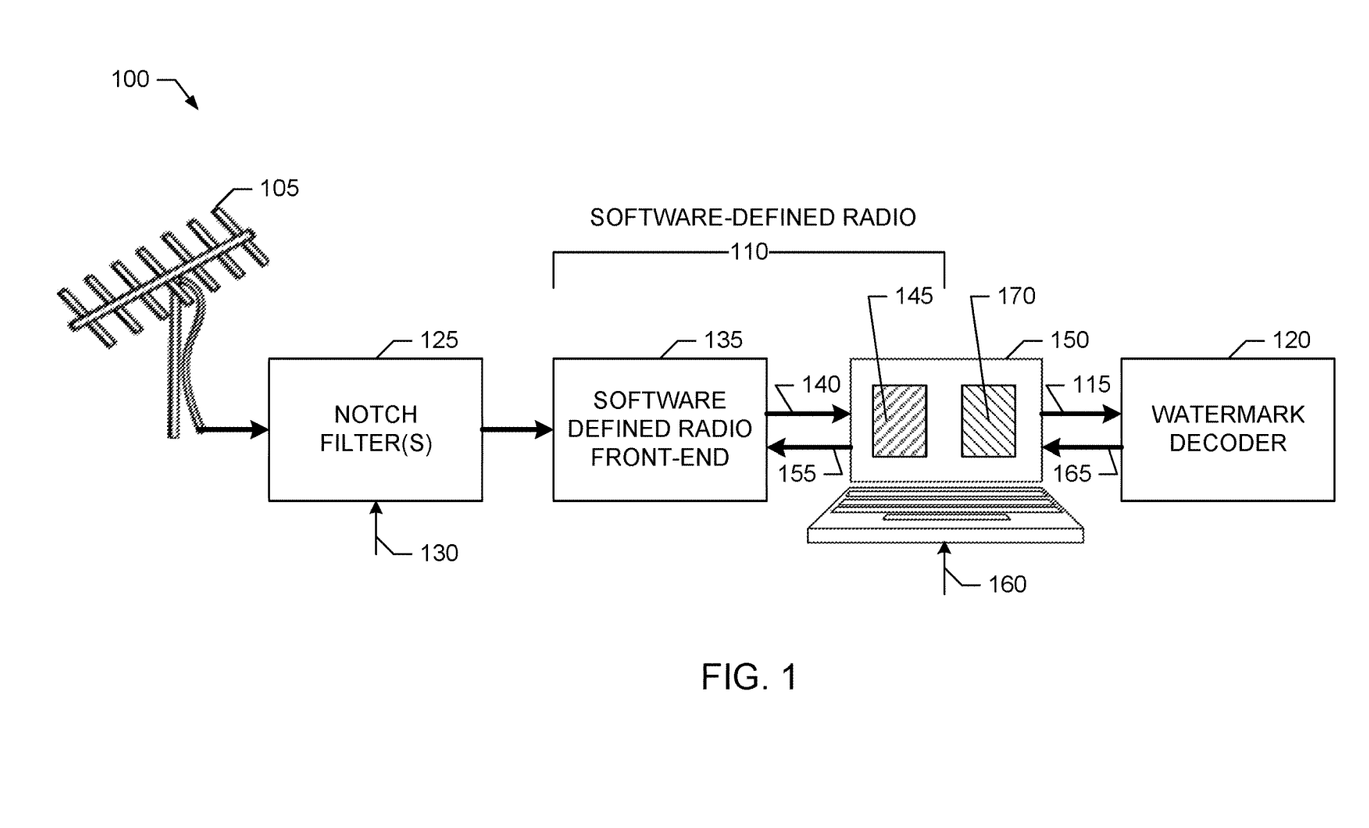
FIG. 1 is a block diagram of an example radio station monitor implemented with an example software defined radio in accordance with the teachings of this disclosure.

Turning to the figures, a block diagram of an example SDR-based radio station monitor 100 implemented in accordance with the teachings of this disclosure is illustrated in FIG. 1. The radio station monitor 100 of the illustrated example includes one or more example antennas 105 to receive one or more radio frequency bands, such as the FM radio band, the AM radio band, etc., in a geographic area. The example radio station monitor 100 also includes an example SDR 110 to receive individual radio station broadcast signals being broadcast in the radio band(s) received by the antenna(s) 105. The SDR 110 of the illustrated example further outputs example audio data 115 corresponding to a received radio station. The example radio station monitor 100 of FIG. 1 also includes an example watermark decoder 120 to process the output audio data 115 for a given received radio station to detect and verify the watermarks that were embedded in the audio data 115 of the given radio station broadcast signal.

In the illustrated example of FIG. 1, the radio station monitor 100 further includes one or more example notch filters 125 coupled between the antenna(s) 105 and the SDR 110 to attenuate (e.g., remove) one or more dominant radio station broadcast signals in the radio frequency band being received by the antenna(s) 105 prior to processing by the SDR 110. In the illustrated example of FIG. 1, each notch filter 125 is adjustable based on one or more example calibration inputs 130. For example, a given notch filter 125 can include a corresponding calibration input 130, such as a set screw, to adjust a center frequency of the notch filter to attenuate a radio station broadcast signal having a carrier frequency corresponding to that filter center frequency. In some examples, a given notch filter 125 can additionally or alternatively include other calibration input(s) 130 to adjust, for example, a bandwidth of the notch filter 125 to correspond to the bandwidth of an FM radio station vs. an AM radio station broadcast signal, an amount of attenuation to be applied by the notch filter 125, etc.

In some examples, multiple notch filters 125 are included in the example radio station monitor 100 to attenuate (e.g., remove) multiple dominant radio station broadcast signals in the radio frequency band being received by the antenna(s)

105 prior to processing by the SDR 110. For example, a first notch filter 125 is calibrated based on its input(s) 130 to attenuate (e.g., remove) a first radio station broadcast signal, a second notch filter 125 is calibrated based on its input(s) 130 to attenuate (e.g., remove) a second radio station broadcast signal, etc., and so on for the number of dominant radio station broadcast signals to be attenuated (e.g., removed). In some such examples, the multiple notch filters 125 are coupled in series such that an input of the first notch filter 125 is in communication with an output of the antenna(s) 105, the output of the second notch filter 125 is in communication with an input of the SDR 110, and an output of the of the first notch filter 125 is in communication with an input of the second notch filter 125. Additional notch filters 125 can be coupled in series between the output of the first notch filter 125 and the input of the second notch filter 125 to attenuate (e.g., remove) additional radio station broadcast signals, as appropriate.

As used herein, the phrase "in communication," including variants thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

In the illustrated example of FIG. 1, the SDR 110 of the radio station monitor 100 is tuned to receive a given radio station broadcast signal from a final output of the notch filter(s) 125. Thus, the SDR 110 of the example radio station monitor 100 is used to receive a radio station broadcast signal different from the dominant radio station broadcast signal(s) being attenuated (e.g., removed) by the notch filter(s) 125. In some examples, the radio station broadcast signal(s) being attenuated (e.g., removed) by the notch filter(s) 125 is(are) monitored by separate radio station monitor(s) (not shown) used in combination with the radio station monitor 100 of the illustrated examples.

In the illustrated example of FIG. 1, the SDR 110 of the radio station monitor 100 includes an example SDR front-end 135 to downconvert some or all of a given radio frequency band (e.g., FM band, AM band, etc.), which contains the radio station broadcast signals (e.g., FM broadcasts, AM broadcasts, etc.) undergoing watermarking verification, to an example baseband signal 140. The example SDR front-end 135 can be implemented by, for example, any universal software radio peripheral (USRP) platform supporting a frequency range and bandwidth sufficient to downconvert the radio frequency band including the radio station broadcast signals of interest. For example, the SDR front-end 135 can be implemented by the B200 USRP from Ettus Research™, which supports a frequency range and bandwidth (e.g., 60 MHz) large enough to downconvert the FM radio band, as well as the AM radio band. As another example, to downconvert the AM radio band, the SDR front-end 135 can be implemented by, for example, the RTL2832U radio tuner dongle from Realtek™, which supports a lower bandwidth (e.g., 4 MHz) than the B200 USRP, but also has a lower cost. Of course, other SDR front-end solutions can be used to implement the SDR front-end 135, and the SDR 110 of the illustrated example is not limited to a particular type of SDR front-end 135.

The example SDR 110 of FIG. 1 also includes an example SDR application 145 to tune to a portion of the baseband signal 140 (which is output by the SDR front-end 135) corresponding to a given radio station broadcast signal to be validated, and to demodulate the tuned portion of the baseband signal 140 to generate the audio data 115 corresponding to the tuned radio station. The SDR application 145 of the illustrated example is a software application executable by a processor. For example, the SDR application 145 can be implemented by the GNU Radio Toolkit. In the illustrated example of FIG. 1, the radio station monitor 100 includes an example watermark verification processor 150, which is a processor-based system that is to execute the SDR application 145 and provide other functionality, as disclosed in further detail below.

The example SDR application 145 of FIG. 1 controls operation of the SDR front-end 135 via an example control interface 155. For example, the control interface 155 can be implemented by control lines, registers, messages, etc., and/or any other mechanism for configuring operation of the SDR front-end 135. For example, the SDR application 145 uses the SDR front-end 135 to configure a receiver center frequency of the SDR front-end 135 to correspond to a center frequency substantially at the midpoint of the radio frequency band to be downconverted by the SDR front-end 135. For example, to downconvert the FM radio band, the SDR application 145 configures the receiver center frequency of the SDR front-end 135 to correspond to a value of 98 MHz (e.g., within a tolerance interval), which is substantially at the midpoint of the FM radio band (e.g., which ranges from 88 MHz to 108 MHz). As another example, to downconvert the AM radio band, the SDR application 145 configures the receiver center frequency of the SDR front-end 135 to correspond to a value of 1120 kHz (e.g., within a tolerance interval), which is substantially at the midpoint of the AM radio band (e.g., which ranges from 535 kHz to 1705 kHz)

The example SDR application 145 of FIG. 1 also implements signal processing functionality to process the baseband signal 140 output from the SDR front-end 135. For example, the SDR application 145 can include a tuner to tune to a portion of the baseband signal 140 corresponding to a given radio station broadcast signal of interest. For example, the portion of the baseband signal 140 corresponding to given radio station broadcast signal is centered at a frequency of the baseband signal corresponding to the difference between the given radio station's carrier frequency and the receiver center frequency of the SDR front-end 135, and has a bandwidth corresponding to the bandwidth of the given radio station broadcast signal of interest. In some examples, the SDR application 145 also includes an FM demodulator to demodulate the tuned portion of the baseband signal 140 to generate the audio data 115 for an FM radio station being received by the SDR 110. Additionally or alternatively, in some examples, the SDR application 145 can include an AM demodulator to demodulate the tuned portion of the baseband signal 140 to generate the audio data 115 for an AM radio station being received by the SDR 110.

As such, the watermark verification processor 150 accepts example configuration input data 160 to configure operation of the SDR 110. For example, the configuration input data 160 can include the receiver center frequency for the SDR front-end 135, which the SDR application 145 uses to configure SDR front-end 135 via the configuration interface 155 to downconvert the radio frequency band, which includes the radio station broadcast signals of interest, to baseband. In some examples, the configuration input data 160 specifies the carrier frequency of the radio station to be tuned by the SDR application 145, and a type of demodulator (e.g., an FM demodulator, an AM demodulator) to be invoked by the SDR application 145 to process the baseband signal 140 output from the SDR front-end 135. The example watermark verification processor 150 accepts the configuration input data 160 via one or more input devices, such as one or more of the example input devices 722 of the example processor platform 700 of FIG. 7, which is described in further detail below.

As noted above, the audio data 115 determined by the SDR 110 for a given received radio station signal is processed by the example watermark decoder 120 to detect and verify the watermarks that were embedded in the audio data 115 of the given radio station broadcast signal. Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

In some examples, the watermark decoder 120 implements watermark decoding algorithms to decode The Nielsen Company (US), LLC's critical band encoding technology (CBET) watermarks and/or enhanced CBET watermarks. Further examples of watermarks and corresponding example watermark detection techniques that may be implemented by the example watermark decoder 120 are described in U.S. Pat. No. 8,359,205, entitled "Methods and Apparatus to Perform Audio Watermarking and Watermark Detection and Extraction," which issued on Jan. 22, 2013, U.S. Pat. No. 8,369,972, entitled "Methods and Apparatus to Perform Audio Watermarking Detection and Extraction," which issued on Feb. 5, 2013, U.S. Publication No. 2010/0223062, entitled "Methods and Apparatus to Perform Audio Watermarking and Watermark Detection and Extraction," which was published on Sep. 2, 2010, U.S. Pat. No. 6,871,180, entitled "Decoding of Information in Audio Signals," which issued on Mar. 22, 2005, U.S. Pat. No. 5,764,763, entitled "Apparatus and Methods for Including Codes in Audio Signals and Decoding," which issued on Jun. 9, 1998, U.S. Pat. No. 5,574,962, entitled "Method and Apparatus for Automatically Identifying a Program Including a Sound Signal," which issued on Nov. 12, 1996, U.S. Pat. No. 5,581,800, entitled "Method and Apparatus for Automatically Identifying a Program Including a Sound Signal," which issued on Dec. 3, 1996, U.S. Pat. No. 5,787,334, entitled "Method and Apparatus for Automatically Identifying a Program Including a Sound Signal," which issued on Jul. 28, 1998, and U.S. Pat. No. 5,450,490, entitled "Apparatus and Methods for Including Codes in Audio Signals and Decoding," which issued on Sep. 12, 1995, all of which are hereby incorporated by reference in their entireties. However, the example watermark decoder 120 can implement additional or alternative watermark decoding techniques, as appropriate, and the example radio station monitor 100 is not limited thereto.

In the illustrated example of FIG. 1, the watermark decoder 120 provides example decoding results 165 to the watermark verification processor 150. For example, the decoding results 165 can indicate whether valid watermarks were detected in the audio data 115 (e.g., based on successful error checking results) for the radio station to which the SDR 110 is tuned, the payload data contained in the detected watermarks (if any), the watermark detection rate, etc. The watermark verification processor 150 of the illustrated example implements an example validation graphical user interface (GUI) 170 to report (e.g., display) data based on the decoding results 165 provided by the watermark decoder 120. For example, the validation GUI 170 can display the raw decoding results 165 provided by the watermark decoder 120. Additionally or alternatively, in some examples, the validation GUI 170 display a verification summary for the audio watermarking associated with the radio station to which the SDR 110 is tuned. For example, the validation GUI 170 display may display an indication that audio watermark verification for a given radio station was successful if the payload data conveyed by a decoded watermark matches the expected payload data for that radio station, and the watermark detection rate corresponds to an expected watermark embedding rate, etc. Conversely, in some examples, the validation GUI 170 display may display an indication that audio watermark verification for the given radio station was unsuccessful if the payload data conveyed by a decoded watermark does not match the expected payload data for that radio station, or the watermark detection rate does not correspond to the expected watermark embedding rate, etc. In some examples, the validation GUI 170 also displays value(s) for some or all of the configuration input data 160 being input to the watermark verification processor 150.

In the example of FIG. 1, the watermark decoder 120 is illustrated as being implemented separately from the watermark verification processor 150. However, in some examples, the watermark decoder 120 is implemented by a watermark decoding application executed by the watermark verification processor 150.

Figure 2:
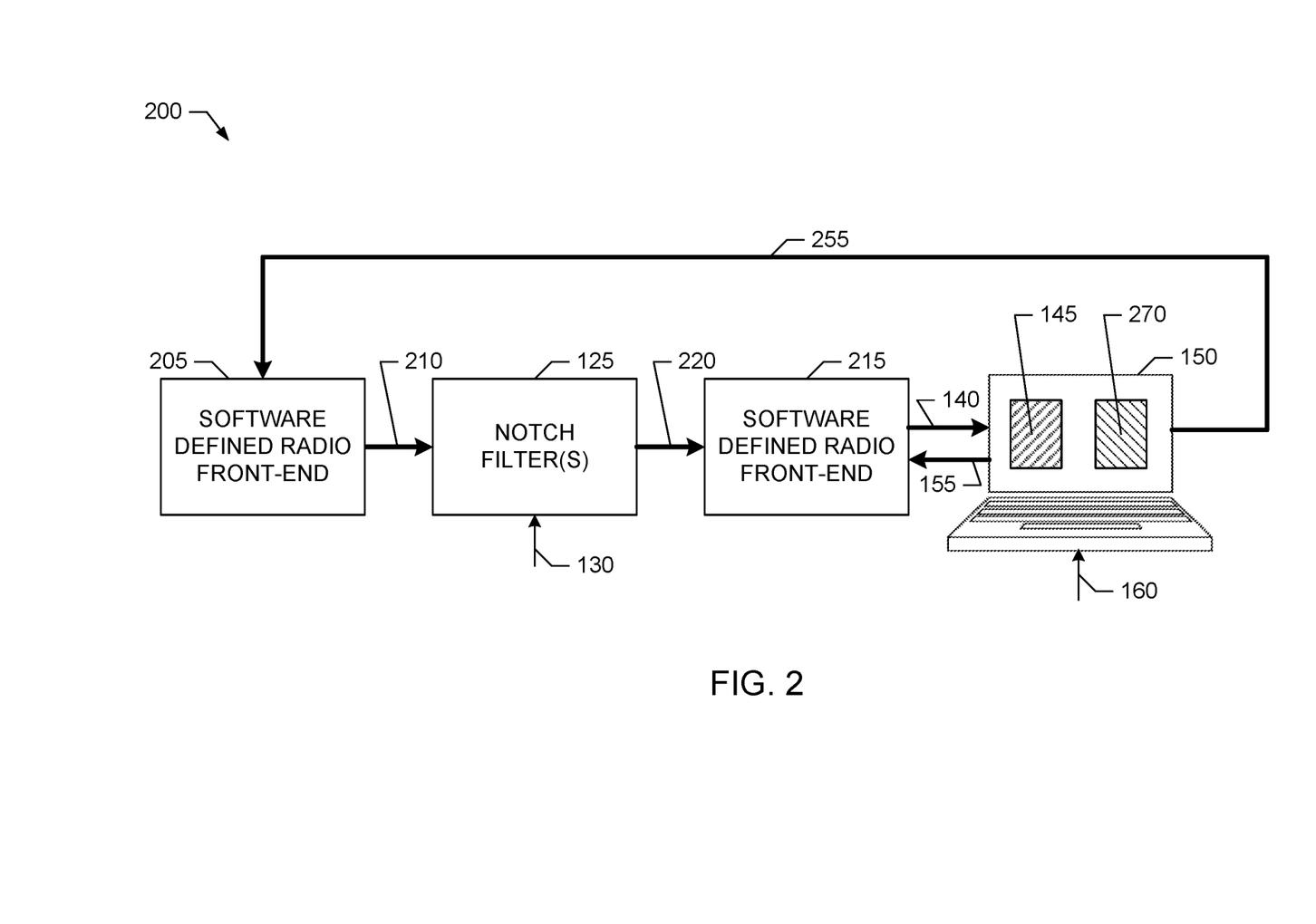
FIG. 2 is a block diagram of an example calibration system to calibrate an example notch filter used to implement the example radio station monitor of FIG. 1.

A block diagram of an example calibration system 200 to calibrate the example notch filter(s) 125 of the example radio station monitor 100 of FIG. 1 is illustrated in FIG. 2. The example calibration system 200 includes the example watermark verification processor 150 to control system operation and to display the results of calibrating a notch filter 125. The example calibration system 200 also includes a first example SDR front-end 205 to generate an example calibration signal 210 to input to the notch filter 125 undergoing calibration. The example calibration further includes a second example SDR front-end 215 to receive an example output signal 220 output from the notch filter 125 undergoing calibration and to downconvert the output signal 220 to the baseband signal 140 to be processed by the example SDR application 145 executed by the watermark verification processor 150. In the illustrated example of FIG. 2, the SDR application 145 controls the second example SDR front-end 215 via the example control interface 155, and controls the first example SDR front-end 205 via another example control interface 255. The example control interface 255 may be implemented in a manner similar to, or different from, the example control interface 155.

The example calibration system 200 of FIG. 2 can be used to calibrate a notch filter 125 as follows without involving special test/measurement equipment (e.g., such as signal generators, spectrum analyzers, etc.). To begin calibration, the example watermark verification processor 150 receives input data 160 to place the watermark verification processor 150 in calibration mode (e.g., in contrast with a normal operation mode associated with implementing the example radio station monitor 100). In response, the SDR application 145 is configured to generate one or more sinusoidal signals (e.g., tones). For example, the SDR application 145 may invoke a polyphase synthesizer function to generate one or more sinusoidal signals spaced apart by a specified bandwidth provided in the input data 160. For example, the spacing may be 100 kHz, which corresponds to half the spacing between FM radio stations. The number of sinusoidal signals to be generated may be specified in the input data 160 based on the bandwidth of the second example SDR front-end 215. For example, if the RTL2832U radio tuner dongle from Realtek™ is used to implement the second example SDR front-end 215, the number of generated sinusoidal signals may be set to cover a 3.2 MHz bandwidth supported by the RTL2832U.

The example SDR application 145 then provides, via the example control interface 255, transmit data corresponding to the generated sinusoidal signals to the first example SDR front-end 205, as well as a transmitter center frequency specified by the input data 160. In some examples, the first SDR front-end 205 may be implemented by the B200 USRP from Ettus Research™, which includes a radio transmitter to upconvert the transmit data provided by the SDR application 145 via the control interface 255 to an RF carrier frequency corresponding to the transmitter center frequency configured by the SDR application 145. The resulting upconverted signal forms the calibration signal 210 transmitted by the first example SDR front-end 205.

The SDR application 145 of the illustrated example also configures, via the example control interface 155, the second example SDR front-end 215 with a receiver center frequency specified by the input data 160. The receiver center frequency corresponds to the carrier frequency of the RF broadcast signal to be downconverted by the second example SDR front-end 215 to form the baseband signal 140 input to the SDR application 145 executed by the example watermark verification processor 150. The SDR application 145, when implementing the calibration system 200 of the illustrated example, provides the received baseband signal 140 to a calibration GUI 270 implemented by the watermark verification processor 150. For example, the calibration GUI 270 may display (e.g., as a frequency domain spectrum) the sinusoidal signal(s) (if any) received by the second example SDR front-end 215 after the calibration signal 210 transmitted by the first SDR front-end 205 is filtered by the notch filter 125. In some examples, the calibration GUI 270 may display the strength(s) of the sinusoidal signal(s) (if any) received by the second example SDR front-end 215 relative to the strength(s) of the sinusoidal signal(s) in the calibration signal transmitted by the first example SDR front-end 205.

In some examples, the notch filter 125 is tuned via a set screw and, as such, the filter center frequency of the notch filter 125 is adjusted by turning the set screw. In some such examples, the notch filter 125 is calibrated by (1) controlling, with the SDR application 145 via the control interface 255 as described, the first example SDR front-end 205 to transmit (e.g., in the calibration signal 210) a sinusoidal signal having a carrier frequency corresponding to the radio station broadcast signal to be attenuated (e.g., removed), (2) controlling, with the SDR application 145 via the control interface 155 as described, the second example SDR front-end 215 to form the baseband signal 140 by downconverting an RF signal having a carrier frequency and bandwidth covering the radio station broadcast signal to be attenuated (e.g., removed) and (3) adjusting the set screw of the notch filter 125 until the GUI 270 indicates the sinusoidal signal included in the RF signal received by the second example SDR front-end 215 and having a carrier frequency corresponding to the radio station broadcast signal to be attenuated (e.g., removed) is attenuated by at least a threshold amount (e.g., 20 dB, 30 dB, etc.) relative to a strength of the corresponding sinusoidal signal transmitted by the first example SDR front-end 205 at the same carrier frequency. The foregoing procedure can be used to tune each notch filter 125 to attenuate (e.g., remove) a respective dominant radio station broadcast signal.

Figure 3:
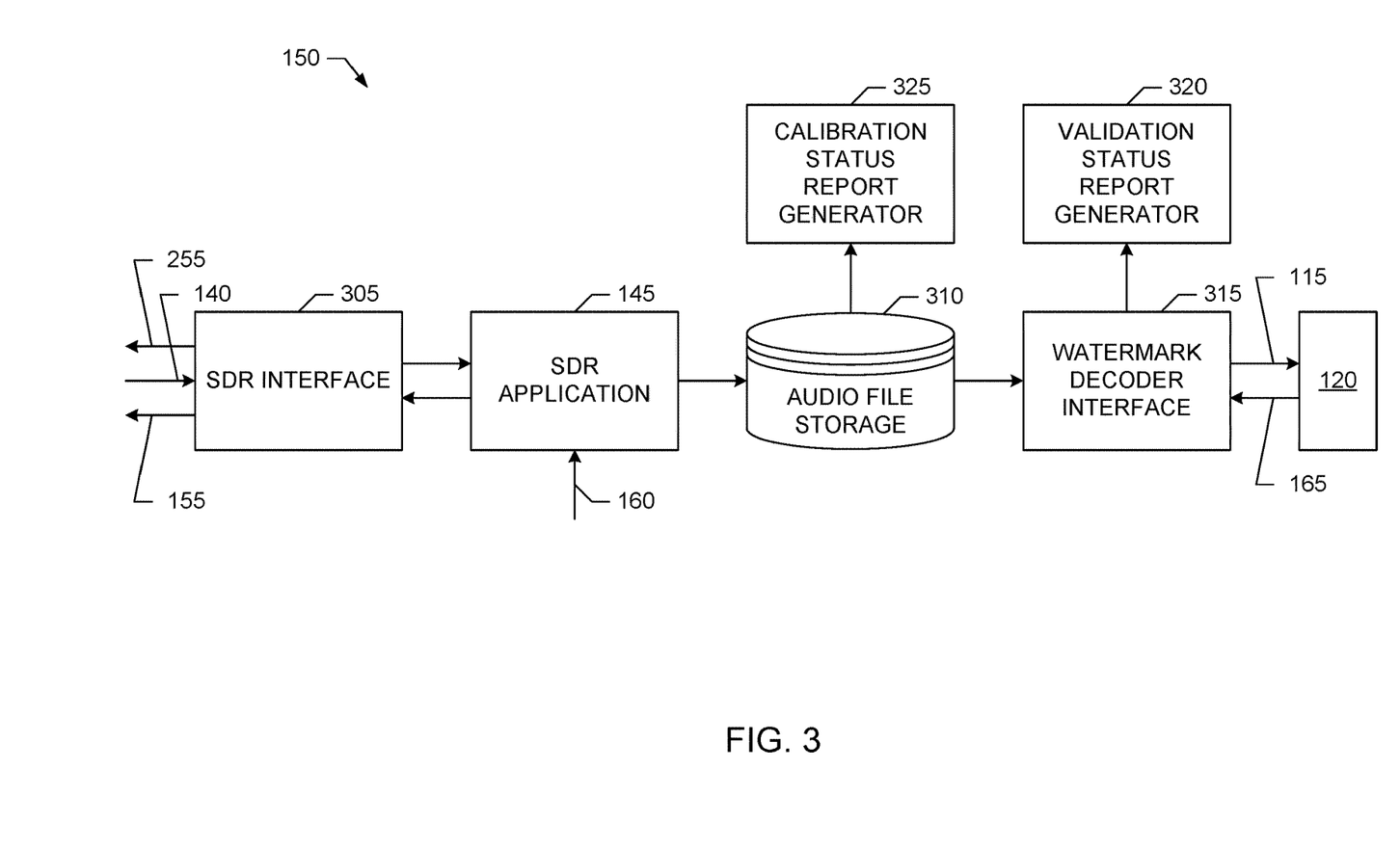
FIG. 3 is a block diagram of an example watermark verification processor that may be used to implement the example radio station monitor of FIG. 1 and/or the example calibration system of FIG. 2.

A block diagram of an example implementation of the example watermark verification processor 150 that may be used to implement the example radio station monitor 100 of FIG. 1 and/or the example calibration system 200 of FIG. 2 is illustrated in FIG. 3. The watermark verification processor 150 includes (e.g., executes) the example SDR application 145 described above, which, based on the example configuration input data 160, controls operation of the example SDR front-ends 135, 205 and/or 215 of FIGS. 1 and/or 2, receives the baseband signal 140 downconverted by the SDR front-ends 135 and/or 215, performs tuning and demodulation of portion(s) of the baseband signal 140 corresponding to radio station broadcast signal(s) undergoing watermarking verification, etc.

The watermark verification processor 150 of FIG. 3 also includes an example SDR interface 305 to interface the example SDR application 145 with the example SDR front-ends 135, 205 and/or 215. For example, the SDR interface 305 implements a digital interface to receive the baseband signal 140 downconverted by the SDR front-ends 135 and/or 215. This baseband signal digital interface can be implemented by any digital appropriate interface supporting a data rate sufficient to receive the baseband signal 140. Examples of such digital interfaces include, but are not limited to, local data interfaces, such as a universal serial bus (USB) interface, an optical interface, etc., and/or network interfaces, such as an Ethernet interface, a WiFi interface, etc. The example SDR interface 305 of FIG. 3 also implements the example control interface 155 and 255 to control the SDR front-ends 135, 205 and/or 215. For example, the SDR interface 305 can implement the example control interface 155 and 255 with any appropriate interfaces, such as, but not limited to, local data interfaces, such as a USB interface, an optical interface, etc., and/or network interfaces, such as an Ethernet interface, a WiFi interface, etc.

The example watermark verification processor 150 of FIG. 3 includes an example audio file storage 310 to store audio files including the respective audio data demodulated (e.g., with its FM demodulator, AM demodulator, etc.) by the SDR application 145 from respective tuned portions of the baseband signal 140 received from the SDR front-end 135 and corresponding to the radio station broadcast signal(s) undergoing watermarking verification. The example audio file storage 310 may be implemented by any type of storage and/or memory device, a database, etc., such as the mass storage device 728 and/or the volatile memory 714 included in the example processing system 700 of FIG. 7, which is described in greater detail below.

The example watermark verification processor 150 of FIG. 3 further includes an example watermark decoder interface 315 to provide an audio file containing the audio data 115 for a demodulated radio station to the example watermark decoder 120, and to receive the associated watermark decoding results 165 from the watermark decoder 120, as described above. In examples in which the watermark decoder 120 is implemented separately from the watermark verification processor 150, the watermark decoder interface 315 can provide the audio file containing the audio data 115 to the watermark decoder 120 and receive the decoding results 165 from the watermark decoder 120 with any appropriate external interfaces, such as, but not limited to, local data interfaces, such as a USB interface, an optical interface, etc., and/or network interfaces, such as an Ethernet interface, a WiFi interface, etc. In examples in which the watermark decoder 120 is implemented by a watermark decoding application executed by the watermark verification processor 150, the watermark decoder interface 315 can provide the audio file containing the audio data 115 to the watermark decoder 120 and receive the decoding results 165 from the watermark decoder 120 with any appropriate internal interfaces, such as, but not limited to, one or more application programming interface (API) calls, function calls, memory mapped exchanges, registers, etc.

The example watermark verification processor 150 of FIG. 3 includes an example validation status report generator 320 to implement the example validation GUI 170 to output a watermark verification report for a radio station undergoing watermarking validation. In some examples, the watermark verification report output by the validation status report generator 320 in the validation GUI 170 is a display of the raw decoding results 165 provided by the watermark decoder 120, such running indications of watermark decoding successes and failures. Additionally or alternatively, in some examples, the watermark verification report output by the validation status report generator 320 in the validation GUI 170 is an indication that audio watermark verification for the given radio station undergoing evaluation was successful if the payload data conveyed by a decoded watermark matches the expected payload data for that radio station, and the watermark detection rate corresponds to an expected watermark embedding rate, etc. Conversely, in some examples, the watermark verification report output by the validation status report generator 320 in the validation GUI 170 is an indication that audio watermark verification for the given radio station undergoing evaluation was unsuccessful if the payload data conveyed by a decoded watermark does not match the expected payload data for that radio station, or the watermark detection rate does not correspond to the expected watermark embedding rate, etc.

The example watermark verification processor 150 of FIG. 3 includes an example calibration status report generator 325 to implement the example calibration GUI 270 to output a calibration status report for use when calibrating an example notch filter 125. In some examples, the calibration status report output by the calibration status report generator 325 in the calibration GUI 270 is a display of the sinusoidal signal(s) (if any) received in the baseband signal 140 downconverted by the second SDR front-end 215 and input to the SDR application 145 after the calibration signal 210 transmitted by the first SDR front-end 205 is filtered by the notch filter 125. In some examples, the calibration status report output by the calibration status report generator 325 in the calibration GUI 270 additionally or alternatively includes a display of the strength(s) of the sinusoidal signal(s) (if any) received by the second example SDR front-end 215 (and included in the downconverted baseband signal 140 input to the SDR application 145) relative to the strength(s) of the sinusoidal signal(s) in the calibration signal 210 transmitted by the first example SDR front-end 205. In some examples, the calibration status report output by the calibration status report generator 325 in the calibration GUI 270 additionally or alternatively includes a display of whether the strength of a received sinusoidal signal corresponding to a desired radio station carrier frequency to be attenuated by the notch filter 125 undergoing calibration has been attenuated by the notch filter 125 by at least a threshold amount relative to a strength of the corresponding transmitted sinusoidal signal included in the transmitted calibration signal 210.

While an example manner of implementing the watermark verification processor 150 is illustrated in FIG. 3, one or more of the elements, processes and/or devices illustrated in FIG. 3 may be combined, divided, re-arranged, omitted, eliminated and/or implemented in any other way. Further, the example SDR application 145, the example watermark decoder 120, the example SDR interface 305, the example audio file storage 310, the example watermark decoder interface 315, the example validation status report generator 320, the example calibration status report generator 325 and/or, more generally, the watermark verification processor 150 of FIG. 3 may be implemented by hardware, software, firmware and/or any combination of hardware, software and/or firmware. Thus, for example, any of the example SDR application 145, the example watermark decoder 120, the example SDR interface 305, the example audio file storage 310, the example watermark decoder interface 315, the example validation status report generator 320, the example calibration status report generator 325 and/or, more generally, the watermark verification processor 150 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example watermark verification processor 150, the example SDR application 145, the example watermark decoder 120, the example SDR interface 305, the example audio file storage 310, the example watermark decoder interface 315, the example validation status report generator 320 and/or the example calibration status report generator 325 is/are hereby expressly defined to include a tangible computer readable storage device or storage disk such as a memory, a digital versatile disk (DVD), a compact disk (CD), a Blu-ray disk, etc. storing the software and/or firmware. Further still, the example watermark verification processor 150 may include one or more elements, processes and/or devices in addition to, or instead of, those illustrated in FIG. 3, and/or may include more than one of any or all of the illustrated elements, processes and devices.

Figure 4:
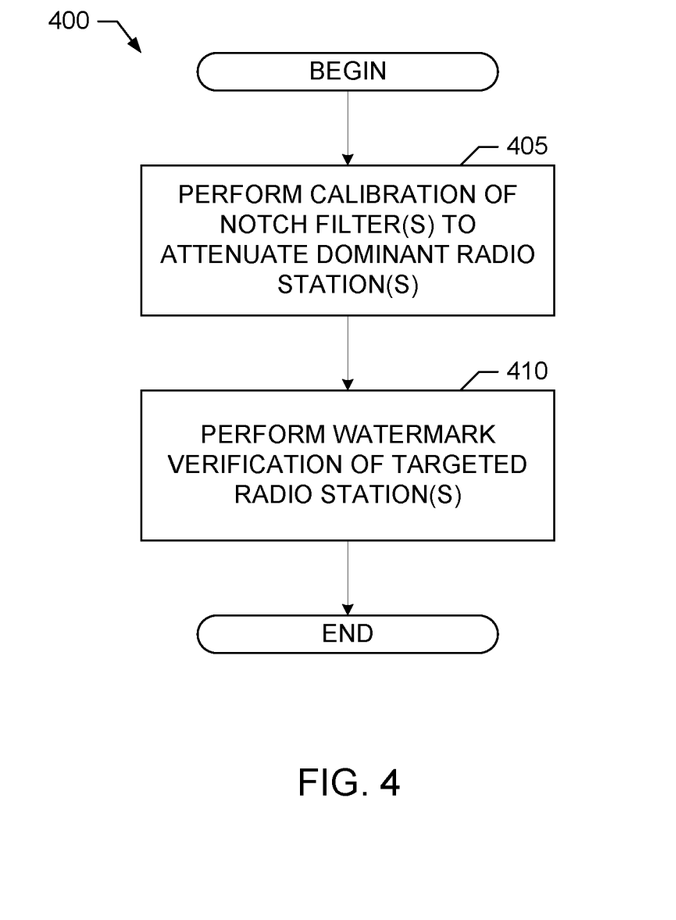
FIG. 4 is a flowchart representative of example computer readable instructions that may be executed to implement the example watermark verification processor of FIG. 3.
Figure 5:
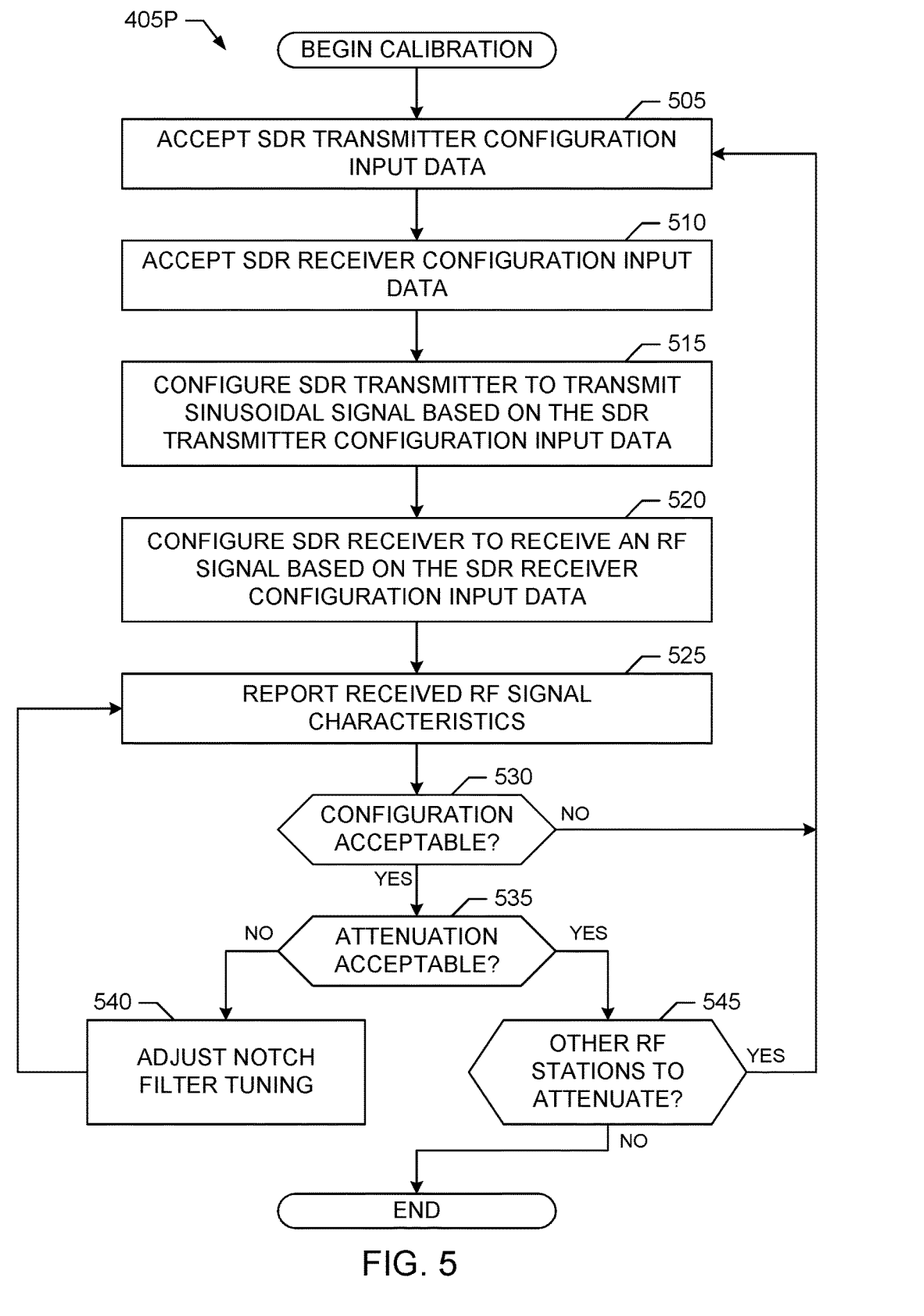
FIG. 5 is a flowchart representative of example computer readable instructions that may be executed to implement notch filter calibration functionality in the example watermark verification processor of FIG. 3.
Figure 6:
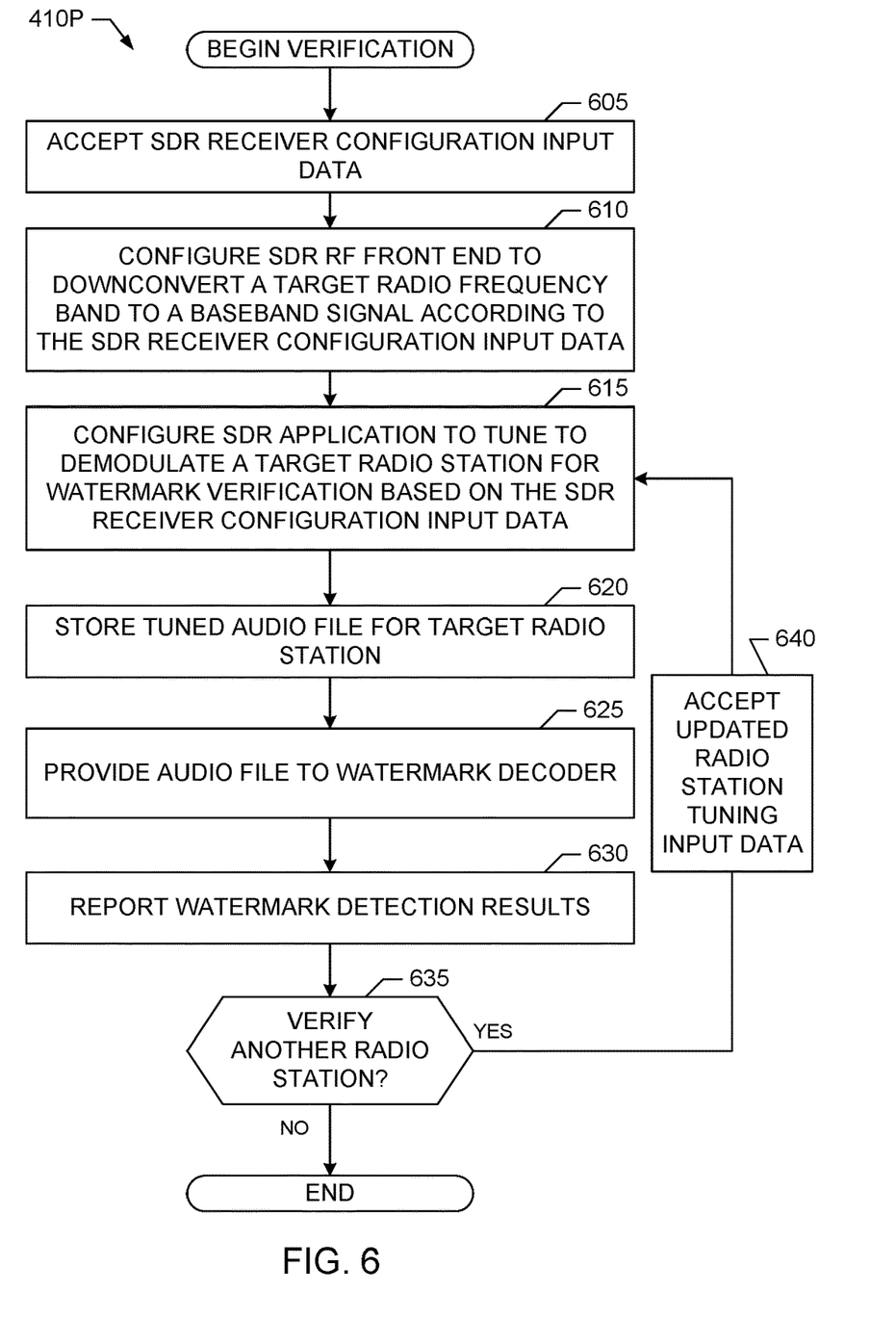
FIG. 6 is a flowchart representative of example computer readable instructions that may be executed to implement watermarking verification functionality in the example watermark verification processor of FIG. 3.

Flowcharts representative of example machine readable instructions for implementing the example watermark verification processor 150, the example SDR application 145, the example watermark decoder 120, the example SDR interface 305, the example audio file storage 310, the example watermark decoder interface 315, the example validation status report generator 320 and/or the example calibration status report generator 325 are shown in FIGS. 4-6. In these examples, the machine readable instructions comprise one or more programs for execution by a processor, such as the processor 712 shown in the example processor platform 700 discussed below in connection with FIG. 7. The one or more programs, or portion(s) thereof, may be embodied in software stored on a tangible computer readable storage medium such as a CD-ROM, a floppy disk, a hard drive, a digital versatile disk (DVD), a Blu-ray disk™, or a memory associated with the processor 712, but the entire program or programs and/or portions thereof could alternatively be executed by a device other than the processor 712 and/or embodied in firmware or dedicated hardware (e.g., implemented by an ASIC, a PLD, an FPLD, discrete logic, etc.). Further, although the example program(s) is(are) described with reference to the flowcharts illustrated in FIGS. 4-6, many other methods of implementing the example watermark verification processor 150, the example SDR application 145, the example watermark decoder 120, the example SDR interface 305, the example audio file storage 310, the example watermark decoder interface 315, the example validation status report generator 320 and/or the example calibration status report generator 325 may alternatively be used. For example, with reference to the flowcharts illustrated in FIGS. 4-6, the order of execution of the blocks may be changed, and/or some of the blocks described may be changed, eliminated, combined and/or subdivided into multiple blocks.

As mentioned above, the example processes of FIGS. 4-6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4-6 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the terms "comprising" and "including" are open ended. Also, as used herein, the terms "computer readable" and "machine readable" are considered equivalent unless indicated otherwise.

An example program 400 that may be executed to implement the example watermark verification processor 150 in the example radio station monitor 100 of FIG. 1 and the example calibration system 200 of FIG. 2 is represented by the flowchart shown in FIG. 4. With reference to the preceding figures and associated written descriptions, the example program 400 of FIG. 4 begins execution at block 405 at which the example watermark verification processor 150 controls the example calibration system 200 to calibrate one or more notch filters 125 to attenuate (e.g., remove) one or more respective, dominant radio station broadcast signals, as disclosed above. Example computer readable instructions that may be executed to implement the processing at block 405 are illustrated in FIG. 5, which is described in further detail below. At block 410, the example watermark verification processor 150 controls the example radio station monitor 100 to monitor and verify watermarking of one or more radio station broadcast signals, as disclosed above. Example computer readable instructions that may be executed to implement the processing at block 410 are illustrated in FIG. 6, which is described in further detail below.

An example program 405P that may be executed to implement the processing at block 405 of FIG. 4, and/or to provide filter calibration functionality for the example watermark verification processor 150 of FIGS. 2 and/or 3, is illustrated in FIG. 5. With reference to the preceding figures and associated written descriptions, the example program 405P of FIG. 5 begins execution at block 505 at which the example SDR application 145 of the example watermark verification processor 150 accepts transmitter configuration input data 160 to configure, as described above, the first example SDR front-end 205 to transmit the calibration signal 210 and to configure operation of the SDR application 145 to generate the sinusoidal signal(s) to include in the calibration signal 210. At block 510, the example SDR application 145 of the example watermark verification processor 150 accepts receiver configuration input data 160 to configure the second example SDR front-end 215 with a receiver center corresponding to the carrier frequency of the RF broadcast signal to be downconverted by the second example SDR front-end 215 to form the baseband signal 140 input to the SDR application 145, as described above. For example, the receiver center frequency specified in the receiver configuration input data 160 obtained at block 510 can correspond to a carrier frequency a dominant radio station broadcast signal to be attenuated (e.g., removed) by a notch filter 125 undergoing calibration.

At block 515, the SDR application 145 configures, as described above, the first example SDR front-end 205 to transmit the calibration signal 210 based on the transmitter configuration input data 160 obtained at block 505. At block 520, the SDR application 145 configures, as described above, the second example SDR front-end 215 to downconvert an RF signal based on the receiver configuration input data 160 obtained at block 510. At block 525, the example calibration status report generator 325 of the watermark verification processor 150 implements, as described above, the example calibration GUI 270 to output a calibration status report (e.g., displaying the sinusoidal signal(s) (if any) received in the baseband signal 140 downconverted by the second SDR front-end 215, as well as their respective signals strengths, and whether the signal strength of the received sinusoidal signal corresponding to the carrier frequency of the target radio station broadcast signal has been attenuated by at least a threshold amount, etc.). If, at block 530, the calibration status report output by the calibration status report generator 325 via the calibration GUI 270 indicates an issue with the calibration configuration parameters (e.g., such as an erroneous configuration), control returns to block 505. However, if the calibration status report indicates the calibration configuration parameters are correct, processing proceeds to block 535.

At block 535, the calibration status report output by the calibration status report generator 325 via the calibration GUI 270 is evaluated to determine whether the attenuation being provided by the notch filter 125 undergoing calibration is acceptable (e.g., the notch filter is attenuating the correct carrier frequency by a proper amount). If the attenuation provided by the notch filter 125 is not acceptable (block 535), at block 540 the tuning of the notch filter 125 is adjusted (e.g., by turning a set screw), as described above. Processing then returns to block 525 to permit an updated calibration status report to be output and evaluated. However, if the attenuation provided by the notch filter 125 is acceptable (block 535), at block 545 the watermark verification processor 150 determines whether other notch filter(s) 125 are to be calibrated to attenuate (e.g., remove) other dominant radio station broadcast signal(s). If other notch filter(s) 125 are to be calibrated (block 545), processing returns to block 505 to enable calibration of another notch filter 125. Otherwise, execution of the example program 405P ends.

An example program 410P that may be executed to implement the processing at block 410 of FIG. 4, and/or to provide watermark verification functionality for the example watermark verification processor 150 of FIGS. 1 and/or 3, is illustrated in FIG. 6. With reference to the preceding figures and associated written descriptions, the example program 410P of FIG. 6 begins execution at block 605 at which the example SDR application 145 of the example watermark verification processor 150 accepts configuration input data 160 to configure the example SDR 110 to perform reception, downconversion, tuning and demodulation of a target radio station broadcast signal that is to undergo watermark verification. At block 610, the SDR application 145 uses the configuration input data 160 to configure, as described above, the example SDR front-end 135 to receive and downconvert a radio frequency band of interest (e.g., the FM radio band, the AM radio band, etc.) to form the example baseband signal 140. At block 615, the SDR application 145 configures, as described above, its tuner and demodulator functionality to tune to a portion of the baseband signal 140 corresponding to the target radio station broadcast signal, and to demodulate the tuned portion of the baseband signal 140 to generate the audio data 115 corresponding to the target radio station broadcast. At block 620, the SDR application 145 stores an audio file including the demodulated audio data for the tuned radio station in the example audio file storage 310.

At block 625, the watermark verification processor 150 provides the audio file for the target radio station broadcast signal undergoing evaluation to the example watermark decoder 120. At block 630, the example validation status report generator 320 of the watermark verification processor 150 receives the watermark decoding results 165 returned by the watermark decoder 120. At block 630, the validation status report generator 320 also implements, as described above, the example validation GUI 170 to output a watermark verification status report for the target radio station broadcast signal undergoing evaluation. For example, the verification status report may provide a display of the raw decoding results 165 provided by the watermark decoder 120, and/or information indicating whether the decoded watermark payload data and/or watermark detection rate correspond to proper or improper watermarking of the target radio station broadcast signal.

At block 635, the watermark verification processor 150 determines whether another radio station broadcast signal is to under watermarking verification. If another radio station broadcast signal is to be verified (block 635), processing proceed to block 640 at which updated configuration input data 160 corresponding to the new target radio station broadcast signal is accepted by the SDR application 145. Processing the returns to block 605 to enable watermark verification of the new target radio station broadcast signal. However, if no other radio station broadcast signal is to be verified (block 635), execution of the example program 410P ends.

Figure 7:
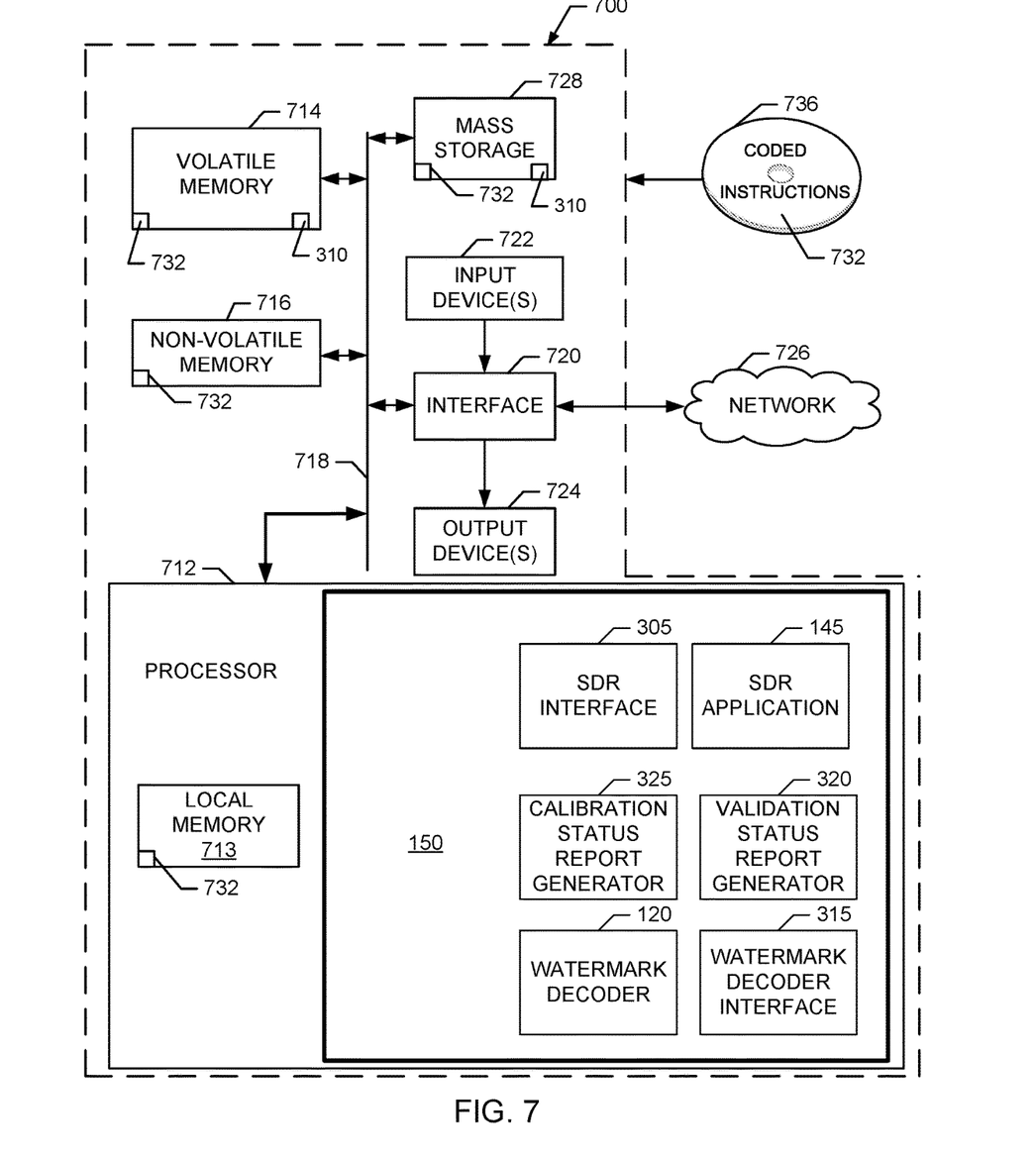
FIG. 7 is a block diagram of an example processor platform that may execute the example computer readable instructions of FIGS. 4, 5 and/or 6 to implement the example watermark verification processor of FIG. 3.

FIG. 7 is a block diagram of an example processor platform 700 capable of executing the instructions of FIGS. 4, 5 and/or 6 to implement the example watermark verification processor 150 in the example radio station monitor 100 of FIG. 1 and/or the example calibration system 200 of FIG. 2. The processor platform 700 can be, for example, a server, a personal computer, a mobile device (e.g., a cell phone, a smart phone, a tablet such as an iPad™), a gaming console, an Internet appliance, a set top box, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer. In some examples, the example processor 712 is configured via example instructions 732, which include the example instructions of FIGS. 4, 5 and/or 6, to implement the example SDR application 145, the example watermark decoder 120, the example SDR interface 305, the example watermark decoder interface 315, the example validation status report generator 320 and/or the example calibration status report generator 325 of the example watermark verification processor 150 of FIGS. 1-3.

The processor 712 of the illustrated example includes a local memory 713 (e.g., a cache). The processor 712 of the illustrated example is in communication with a main memory including a volatile memory 714 and a non-volatile memory 716 via a link 718. The link 718 may be implemented by a bus, one or more point-to-point connections, etc., or a combination thereof. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 700, can allow the user to control the computer system and provide data to the computer using physical gestures, such as, but not limited to, hand or body movements, facial expressions, and face recognition.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID (redundant array of independent disks) systems, and digital versatile disk (DVD) drives. In some examples, the mass storage device 728 may implement the example audio file storage 310 of FIG. 3. Additionally or alternatively, in some examples, the volatile memory 714 may implement the example audio file storage 310 of FIG. 3.

Coded instructions 732 corresponding to the instructions of FIGS. 4, 5 and/or 6 may be stored in the mass storage device 728, in the volatile memory 714, in the non-volatile memory 716, in the local memory 713 and/or on a removable tangible computer readable storage medium, such as a CD or DVD 736.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to detect watermarking of radio station broadcasts, the apparatus comprising:
   a notch filter having a bandwidth and a center frequency corresponding to a first radio station broadcast signal;
   a software defined radio front-end to downconvert a radio frequency band to a baseband signal, the radio frequency band including a second radio station broadcast signal different from the first radio station broadcast signal;
   a software defined radio application executable by a processor to tune to a portion of the baseband signal corresponding to the second radio station broadcast signal and to demodulate the portion of the baseband signal to generate audio data corresponding to the second radio station broadcast signal; and
   a watermark decoder to detect a watermark in the audio data corresponding to the second radio station broadcast signal.

2. The apparatus of claim 1, wherein the center frequency of the notch filter is adjustable.

3. The apparatus of claim 1, wherein the software defined radio front-end is to accept a configuration input specifying a center frequency corresponding to a midpoint of the radio frequency band.

4. The apparatus of claim 3, wherein the radio frequency band further includes the first radio station broadcast signal.

5. The apparatus of claim 1, wherein the software defined radio application is to accept a configuration input specifying a carrier frequency of the second radio station broadcast signal, and the software defined radio application implements at least one of a frequency modulation (FM) demodulator or an amplitude modulation (AM) demodulator to demodulate the portion of the baseband signal to generate the audio data corresponding to the second radio station broadcast signal.

6. The apparatus of claim 1, further including memory to store an audio file including the audio data corresponding to the second radio station broadcast signal, and wherein the watermark decoder is to access the audio data from the audio file.

7. The apparatus of claim 1, wherein the notch filter is a first notch filter, and further including a second notch filter having a bandwidth and a center frequency corresponding to a third radio station broadcast signal, the third radio station broadcast signal different from the first radio station broadcast signal and the second radio station broadcast signal.

8. An apparatus to detect watermarking of radio station broadcasts, the apparatus comprising:
   means for attenuating a first radio station broadcast signal;
   means for downconverting a radio frequency band to a baseband signal, the radio frequency band including a second radio station broadcast signal different from the first radio station broadcast signal;
   means implemented by a processor for tuning to a portion of the baseband signal corresponding to the second radio station broadcast signal and for demodulating the portion of the baseband signal to generate audio data corresponding to the second radio station broadcast signal; and means for detecting a watermark in the audio data corresponding to the second radio station broadcast signal.

9. The apparatus of claim 8, wherein the means for attenuating the first radio station broadcast signal is adjustable to attenuate a third radio station broadcast signal different from the first radio station broadcast signal.

10. The apparatus of claim 8, wherein the means for downconverting the radio frequency band to the baseband signal is to accept a configuration input specifying a center frequency corresponding to a midpoint of the radio frequency band.

11. The apparatus of claim 10, wherein the radio frequency band further includes the first radio station broadcast signal.

12. The apparatus of claim 8, wherein the means for tuning to the portion of the baseband signal corresponding to the second radio station broadcast signal and for demodulating the portion of the baseband signal to generate the audio data includes at least one of a frequency modulation (FM) demodulator or an amplitude modulation (AM) demodulator to demodulate the portion of the baseband signal to generate the audio data corresponding to the second radio station broadcast signal.

13. The apparatus of claim 8, further including means for storing an audio file including the audio data corresponding to the second radio station broadcast signal, and wherein the means for detecting the watermark is to access the audio data from the audio file.

14. The apparatus of claim 8, further including means for attenuating a third radio station broadcast signal different from the first radio station broadcast signal and the second radio station broadcast signal.

15. A method to detect watermarking of radio station broadcasts, the method comprising:

configuring, by executing an instruction with a processor, a software defined radio front-end to downconvert a radio frequency band including a first radio station broadcast signal to a baseband signal;

executing a software defined radio application with the processor to tune to a portion of the baseband signal corresponding to the first radio station broadcast signal and to demodulate the portion of the baseband signal to generate audio data corresponding to the first radio station broadcast signal; and detecting, by executing an instruction with the processor, a watermark in the audio data corresponding to the first radio station broadcast signal.

16. The method of claim 15, wherein the configuring of the software defined radio front-end includes configuring a center frequency of the software defined radio front-end via a configuration input of the software defined radio front-end, the center frequency corresponding to a midpoint of the radio frequency band.

17. The method of claim 16, wherein the radio frequency band further includes a second radio station broadcast signal different from a first radio station broadcast signal.

18. The method of claim 17, wherein the radio frequency band corresponds to an output of a notch filter attenuating the second radio station broadcast signal.

19. The method of claim 18, further including performing a calibration procedure to adjust the notch filter to attenuate the second radio station broadcast signal.

20. The method of claim 15, further including configuring the software defined radio application with a carrier frequency of the first radio station broadcast signal.

* * * * *